(12) United States Patent
Nichols et al.

(10) Patent No.: US 9,810,157 B2
(45) Date of Patent: Nov. 7, 2017

(54) COMPRESSOR SHROUD REVERSE BLEED HOLES

(71) Applicant: Pratt & Whitney Canada Corp., Longueuil (CA)

(72) Inventors: Jason Nichols, Mississauga (CA); Peter Townsend, Mississauga (CA); Hien Duong, Mississauga (CA); Vijay Kandasamy, Tamil Nadu (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 952 days.

(21) Appl. No.: 13/783,773

(22) Filed: Mar. 4, 2013

(65) Prior Publication Data

US 2014/0286746 A1 Sep. 25, 2014

(51) Int. Cl.
*F02C 9/18* (2006.01)
*F01D 5/14* (2006.01)
*F04D 29/68* (2006.01)
*F02C 3/04* (2006.01)
*F04D 27/02* (2006.01)
*F04D 29/52* (2006.01)

(52) U.S. Cl.
CPC .......... *F02C 9/18* (2013.01); *F01D 5/145* (2013.01); *F02C 3/04* (2013.01); *F04D 27/023* (2013.01); *F04D 29/526* (2013.01); *F04D 29/682* (2013.01); *Y02T 50/671* (2013.01)

(58) Field of Classification Search
CPC .... F04D 29/526; F04D 29/682; F04D 27/023; F04D 27/009; F04D 27/02; F04D 27/0207; F04D 27/0215; F04D 27/0238; F04D 29/68; F04D 29/681; F04D 29/684; F04D 29/685; F02C 9/18; F01D 5/145
See application file for complete search history.

(56) References Cited

U.S. PATENT DOCUMENTS

| | | | |
|---|---|---|---|
| 2,720,356 A | 10/1955 | Erwin | |
| 3,462,071 A | 8/1969 | Garve | |
| 3,993,414 A | 11/1976 | Meauze et al. | |
| 4,479,755 A | 10/1984 | Skoe | |
| 4,930,978 A | 6/1990 | Khanna et al. | |
| 5,059,093 A | 10/1991 | Khalid et al. | |
| 5,209,633 A | 5/1993 | McGreehan et al. | |
| 5,282,718 A | 2/1994 | Koff et al. | |
| 5,351,478 A | 10/1994 | Walker et al. | |

(Continued)

*Primary Examiner* — Bryan Lettman
(74) *Attorney, Agent, or Firm* — Norton Rose Fulbright Canada LLP

(57) ABSTRACT

A gas turbine engine compressor includes a rotor defining a central axis of rotation and a plurality of blades which project into an annular compressor gas flow passage, and a shroud circumferentially surrounding the rotor and having a radially inner surface adjacent to the blade tips. Bleed holes extend through the shroud adjacent the blade tips, each of the bleed holes having an inlet end disposed in the shroud radially inner surface and an outlet end disposed in a shroud radially outer surface. Bleed air removed from the annular gas flow passage flows through the bleed holes from the inlet to the outlet ends. The outlet end of each bleed hole is located circumferentially upstream of the inlet end relative to a direction of rotational flow in the annular gas flow passage driven by a direction of rotation of the rotor.

20 Claims, 5 Drawing Sheets

(56) References Cited

U.S. PATENT DOCUMENTS

| | | | |
|---|---|---|---|
| 5,707,206 A | 1/1998 | Goto et al. | |
| 5,904,470 A | 5/1999 | Kerrebrock et al. | |
| 6,183,195 B1 | 2/2001 | Tremaine | |
| 6,325,595 B1 | 12/2001 | Breeze-Stringfellow et al. | |
| 6,428,271 B1 | 8/2002 | Ress, Jr. et al. | |
| 6,783,324 B2 | 8/2004 | Muny | |
| 7,090,462 B2 * | 8/2006 | Martin et al. | 415/144 |
| 7,147,426 B2 | 12/2006 | Leblanc et al. | |
| 7,549,838 B2 | 6/2009 | Touyeras | |
| 2005/0249578 A1 * | 11/2005 | Leblanc et al. | 415/1 |
| 2006/0153673 A1 * | 7/2006 | Guemmer | 415/115 |
| 2010/0034637 A1 * | 2/2010 | Guemmer | F04D 29/526 415/58.5 |

\* cited by examiner

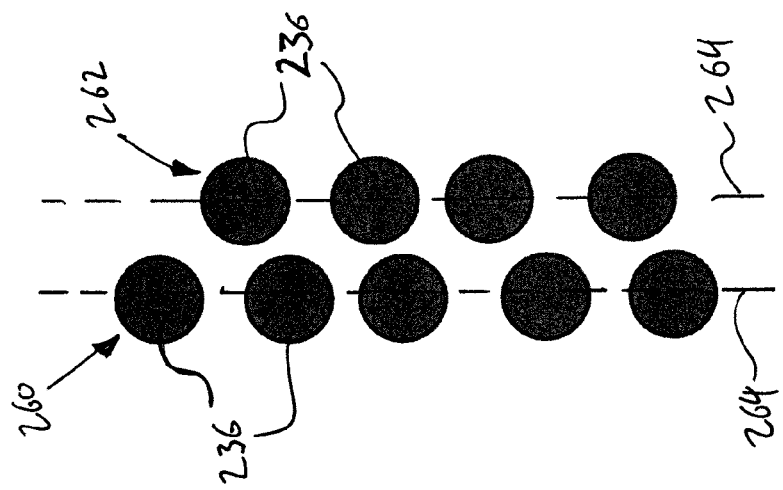

150 # COMPRESSOR SHROUD REVERSE BLEED HOLES

TECHNICAL FIELD

The application relates generally to gas turbine engines, and more particularly to gas turbine engine compressors.

BACKGROUND

Bleeding air from gas turbine engine gas paths, including from compressors, is well known. Air bled from the compressor can be used to provide a source of pressurized and/or cool air to the engine or the aircraft, however air is principally bled from the compressor in order to improve the operating envelope and overall compressor efficiency, which is often expressed as improved surge margin. Bleed flow from other areas of a turbo machine gas path can be used for purposes of component cooling, pressurizing air/oil seals, providing cabin air, performance/operability improvement, and the like.

In a compressor, low momentum flow along the outer shroud of the compressor is known to be detrimental to the aerodynamic performance or to trigger premature rotor stall. Accordingly, bleeding such low momentum air flow at the shroud is performed to improve engine performance and operability. Bleeding air from the compressor shroud can be done in a number of ways, for example using bleed holes or continuous slots formed in the shroud.

Improved shroud bleed hole configurations are however sought.

SUMMARY

There is provided a compressor for a gas turbine engine comprising: a rotor having hub defining a central axis of rotation and a plurality of blades radially extending from the hub to project into an annular gas flow passage of said compressor, each of said blades having a remote blade tip and a leading edge defined between opposed pressure and suction surfaces, said rotor being rotatable about said axis of rotation; an annular shroud circumferentially surrounding the rotor and having a radially inner surface adjacent to the blade tips, the inner surface of the shroud facing said annular gas flow passage; and a plurality of bleed holes extending through said shroud adjacent said blade tips, the bleed holes providing gas flow communication between said annular gas flow passage and a region outside the shroud, each of said bleed holes having an inlet end disposed in the radially inner surface of the shroud adjacent the blade tips to communicate with the annular gas flow passage, each of said bleed holes having an outlet end disposed in a radially outer surface of the shroud, bleed air removed from the annular gas flow passage by the bleed holes flowing from the inlet end to the outlet end of the bleed holes, the outlet end of each of said bleed holes being located circumferentially upstream of the inlet end thereof relative to a direction of rotational flow in the annular gas flow passage driven by a direction of rotation of the rotor.

There is also provided a gas turbine engine comprising: a compressor section, a combustor and a turbine section, in serial flow communication; and at least one of the compressor section and the turbine section including: an axial rotor having hub defining a central axis of rotation and a plurality of blades radially extending from the hub to project into an annular gas flow passage, each of said blades having a remote blade tip and a leading edge defined between opposed pressure and suction surfaces of the blades, said rotor being rotatable about said axis of rotation; a shroud circumferentially surrounding the rotor and having a radially inner surface adjacent to the blade tips, the inner surface of the shroud facing said annular gas flow passage; and a plurality of bleed holes extending through said shroud adjacent said blade tips, the bleed holes providing gas flow communication between said annular gas flow passage and a region outside the shroud, each of said bleed holes having an inlet end disposed in the radially inner surface of the shroud adjacent the blade tips to communicate with the annular gas flow passage, each of said bleed holes having an outlet end disposed in a radially outer surface of the shroud, bleed air removed from the annular gas flow passage by the bleed holes flowing from the inlet end to the outlet end of each of the bleed holes, the outlet end of each of said bleed holes being located circumferentially upstream of the inlet end thereof relative to a direction of rotational flow in the annular gas flow passage driven by a direction of rotation of the rotor.

There is further provided a method of bleeding tip leakage flow from a gas turbine engine compressor comprising: providing a rotor rotatable about an axis of rotation within an outer shroud surrounding said rotor, the rotor having a plurality of radially projecting blades extending into an annular gas flow passage of the compressor, the annular gas flow passage being radially enclosed by an inner surface of the outer shroud, each of said blades having a remote blade tip and a leading edge defined between opposed pressure and suction surfaces, the inner surface of the shroud being adjacent to the blade tips and facing said annular gas flow passage; rotating said rotor to generate a main compressor flow within the annular gas flow passage in a first rotational direction corresponding to a direction of rotation of the rotor, a tip leakage flow being formed between the blade tips and the inner surface of the shroud, the tip leakage flow being in a direction opposite to the direction of rotation of the rotor; and bleeding off at least a portion of the tip leakage flow using a plurality of circumferentially angled bleed holes extending through said shroud adjacent said blade tips, each of said bleed holes being disposed at an orientation at least partially aligned with the direction of the tip leakage flow and opposite to the direction of the main compressor flow driven by a direction of rotation of the rotor.

Further details of these and other aspects of the present invention will be apparent from the detailed description and figures included below.

DESCRIPTION OF THE DRAWINGS

Reference is now made to the accompanying figures, in which:

FIG. 5 is a schematic plan view of a shroud of a compressor in accordance with yet another alternate embodiment.

DETAILED DESCRIPTION

Figure 1:
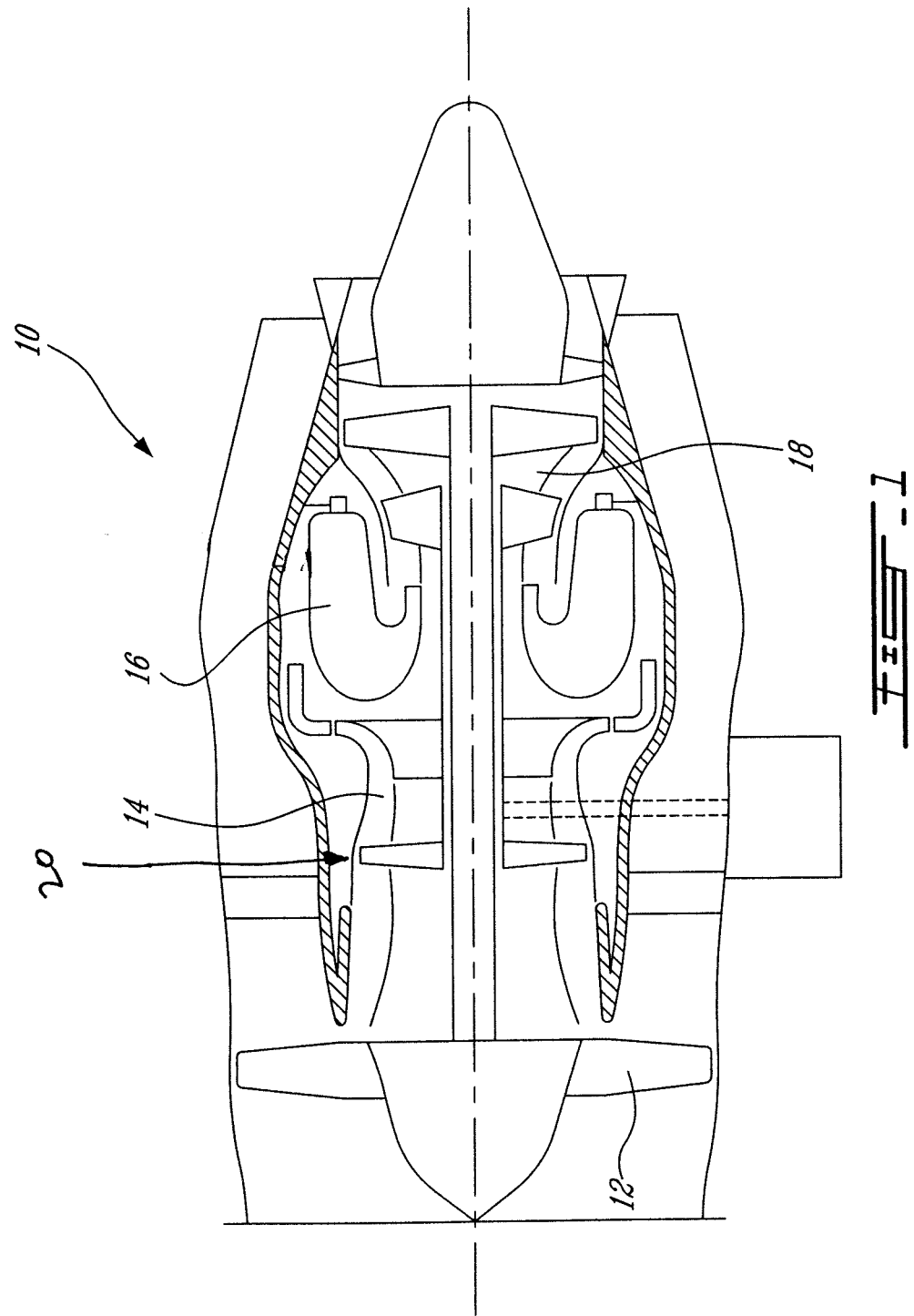
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The multistage compressor section 14 includes an axial compressor 20, as will be further described. Although a turbofan engine is depicted and described herein, it will be understood however that the gas turbine engine 10 may comprise other types of gas turbine engines such as a turbo-shaft, a turbo-prop, or auxiliary power units.

The compressor section 14 of the gas turbine engine 10 may be a multi-stage compressor, and thus may comprise several axial and/or centrifugal compressors. Although the present disclosure will focus on an axial compressor 20, i.e. having an axial turbo machine rotor, it is to be understood that the compressor 20 as described herein may also be a centrifugal compressor and/or a mixed flow rotor.

Figure 2:
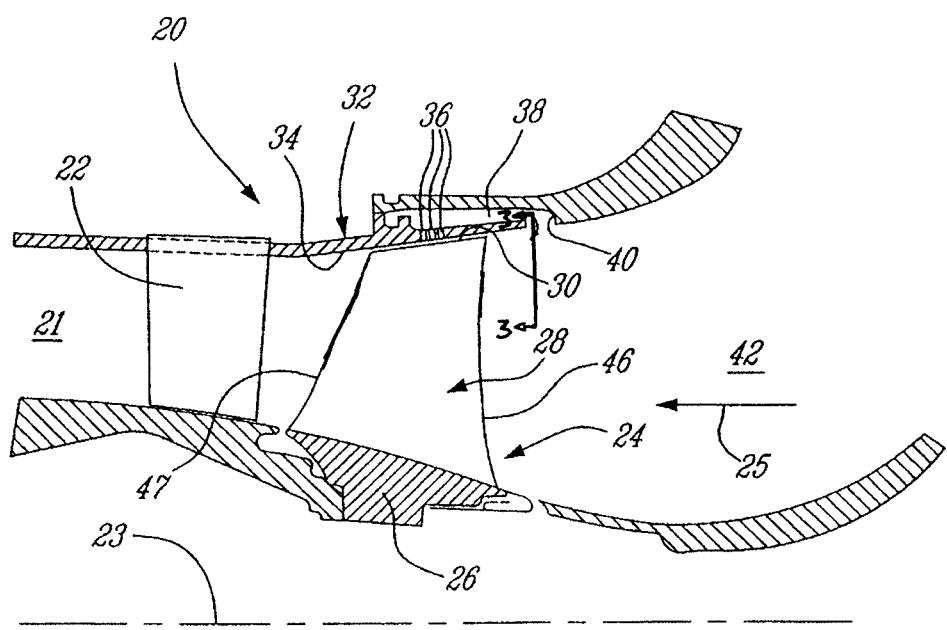
FIG. 2 is a partial cross-sectional view of a compressor of the gas turbine engine of FIG. 1.
Figure 3:
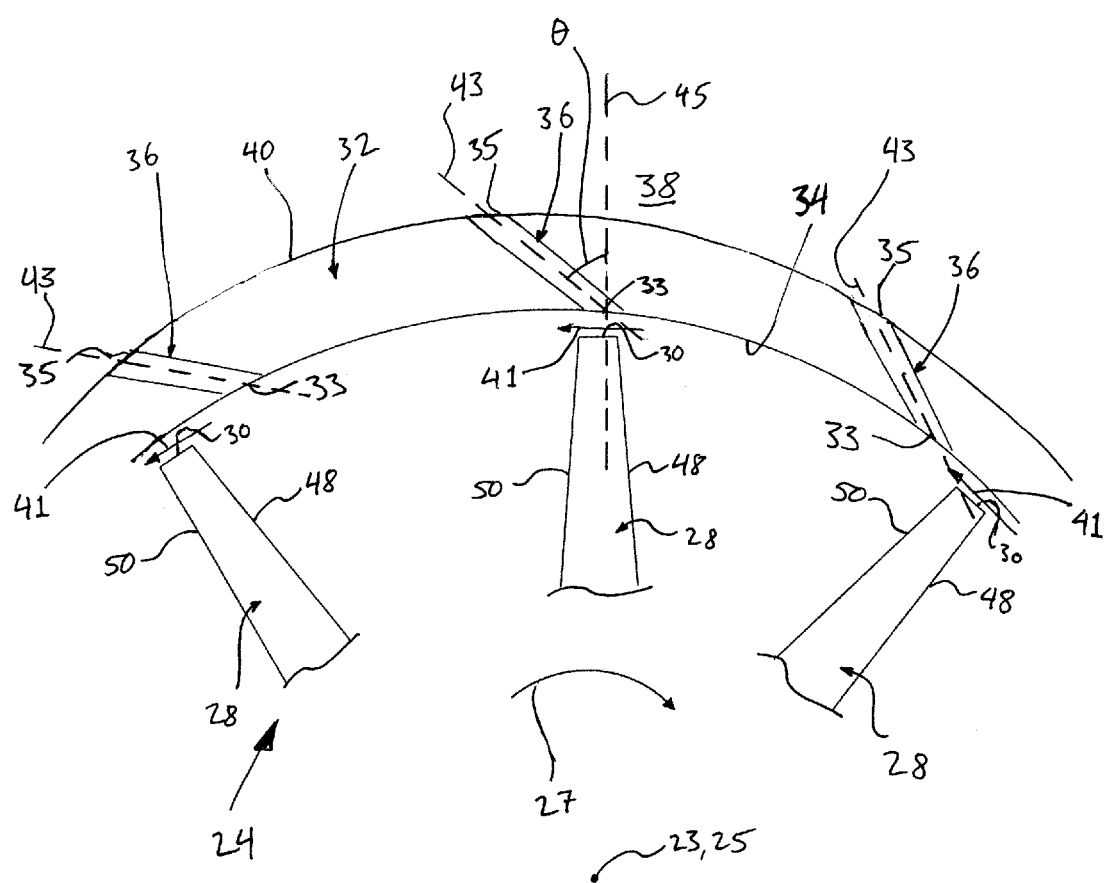
FIG. 3 is schematic front cross-sectional view, taken along line 3-3 of FIG. 2.

Referring to FIGS. 2 and 3, an axial compressor 20 of the compressor section 14 comprises generally a rotor 24 and a stator 22 downstream relative thereto, each having a plurality of blades defined within the gas flow path which is defined by the compressor inlet passage 42 upstream of the rotor 24 and the compressor discharge passage 21 downstream of the stator 22. The gas flowing in direction 25 is accordingly fed to the compressor 20 via the compressor inlet passage 42 and exits therefrom via the compressor discharge passage 21. The rotor 24 rotates about a central axis of rotation 23 within the stationary and circumferentially extending outer shroud 32, the radially inwardly facing wall 34 of which defines a radial outer boundary of the annular gas flow path through the compressor 20. The rotor 24 includes a central hub 26 and a plurality of blades 28 radially extending therefrom and terminating in blade tips 30 immediately adjacent the outer shroud 32.

The rotation of the compressor rotor 24 is shown in FIG. 3 by displacement of the rotor blades 28 in direction 27 about the central axis 23 and relative to the gas flow direction 25 which is substantially parallel to the longitudinally extending central axis 23. Each blade 28 includes a leading edge 46 defined between a pressure surface, or pressure side, 48 of the blade and a suction surface, or suction side, 50 of the blade, as best seen in FIG. 3.

The stationary outer shroud 32, which extends circumferentially and radially surrounds the tips 30 of the rotor blades 28, includes a plurality of bleed holes 36 in at least a portion thereof axially aligned with the blade tips 30 of the rotor 24. These shroud bleed holes 36 provide fluid flow communication between the annular main compressor gas path 42, defined radially within the outer shroud 32, and a bleed passage 38 disposed radially outward from the shroud 32, such as to permit the flow (or "bleed") of air out of the main gas path from near the surface of the shroud 32. The bleed passage 38 may be disposed adjacent to the rotor 24 and defines an annular cavity which received the bleed air. Alternately, however, the bleed flow extracted through the bleed holes 36 in the outer shroud 32 can be discharged and/or re-introduced elsewhere in the engine, be it back into the main engine gas path at a different point or into another air system for use with secondary functions such as for component cooling, pressurizing air/oil seals, providing cabin air, etc.

Thus, the shroud bleed holes 36 passively bleed air from the compressor 20, more specifically the bleed holes 36 bleed away low momentum air flow at the shroud, and therefore from adjacent the compressor blade tips 30, to thereby improve compressor (and therefore engine) performance and operability.

As air is passively bled through the shroud bleed holes 36, there is accordingly a continuous bleed of air from the main gas path of the compressor. Such a passive bleed design allows for self regulation of the bleed flow based on flow conditions, shock properties, etc. As these can be predetermined by one skilled in the art, the necessary amount of bleed flow can be established and regulated, for example such as to bleed off substantially only low momentum flow or a shockwave-induced boundary layer from the gas path of a transonic compressor, etc.

Referring now to FIG. 3 in greater detail, the bleed holes 36 in the shroud 32 are circumferentially angled such that they extend therethrough in a direction which is opposite to the direction of rotation of the rotor blades 28. More particularly, the bleed holes 36 each have an inlet end 33, the inlet end 33 being disposed in an inner surface 34 of the outer shroud 32 and communicating with the main gas flow passage 42, and an outlet end 35, disposed in a radially outer surface 40 of the outer shroud 32. Each bleed hole 36 extends between the inlet end 33 and the outlet end 35 thereof, and defines a central bleed hole axis 43 therethrough. This axis 43 defines the orientation of the bleed hole 36.

The outlet end 35 of each of the bleed holes 36 is located circumferentially upstream, relative to the direction 27 of rotation of the compressor rotor 24 and thus the direction of rotational flow in the main gas flow passage 42, of the inlet end 33 of the same bleed hole 36. In other words, the bleed holes 36 are disposed at an orientation and direction which is substantially opposite to a direction of flow in the main gas path, which in turn corresponds to, and is driven by, the direction of rotation 27 of the rotor 24. For example, in at least one possible embodiment, the bleed hole axis 43 the bleed holes 36 may be orientated at an angle θ of between 25 degrees and 65 degrees (i.e. approximately 45 degrees+/− 20 degrees) relative to a radially extending reference axis 45 disposed at the inlet 33 of the bleed hole 36, as shown in FIG. 3. In the depicted embodiment, the bleed holes 36 lie in a common plane which is substantially perpendicular to the axis of rotation 23 of the rotor. The bleed holes 36 extend in both a radial and circumferential direction, i.e. in a direction defined by the bleed hole axis 43 having both a radial and a circumferential component, from the radially inner inlet ends 33 to the radially outer outlet ends 35 thereof. As such, the circumferential component of the bleed air flow through each of the bleed holes 36, when flowing from the inlet end 33 to the outlet end 35, is opposite in direction to the circumferential component of the rotational air flow in the main gas path as driven by the direction of rotation 27 of the rotor 24.

The bleed holes 36 are therefore disposed at an angle which is expressly in misalignment with the direction of gas flow in the main annular gas path, as driven by the compressor rotor 24. While somewhat counterintuitive, the fact that the bleed holes 36 are oriented at an angle that is opposite to the flow of gas in the main gas path has been found to render the bleed holes 36 more effective at removing tip leakage flow from adjacent the shroud. As seen in FIG. 3, leakage flow 41 between the tips 30 of each of the rotating blades 28 and the surrounding shroud 32 occurs during rotation of the rotor 24, and is mainly driven by pressure differential across the airfoils 28. More particularly, this leakage flow 41 occurs from pressure the side 38 to the suction side 50 of each airfoil, in the direction as shown in FIG. 3. This leakage flow 41 is therefore opposite in direction to the direction of rotation 27 of the rotor 24. It has been found that by orienting the bleed holes 36 in a direction that is opposite to the direction of rotation 27, the bleed holes 36 will therefore be more aligned with the tip leakage flow 41. As a result, the bleed holes 36 of the present compressor 20 are more effective at removing, or bleeding off, unwanted leakage flow 41, and also less disruptive to the main gas flow path within the compressor. The bleed holes 36 in the shroud 32 of the present compressor 20 therefore enable increased bleed of the undesirable tip leakage flow 41, because the orientation of the bleed holes 36 is more aligned with the leakage flow direction, and thus provides a cleaner main gas path flow at the shroud of the compressor.

By more effectively targeting and removing the tip-shroud leakage flow 41, the "reverse angled" bleed holes 36 thereby permit the overall aerodynamic performance and operability envelope of the compressor 20, and therefore of the gas turbine engine 10, to be improved. More particularly, by more effectively reducing the tip leakage flow using the reverse bleed holes 36 of the present compressor 20, a number of possible advantages may be possible, including for example only one or more of the following: performance improvements, leading to lower fuel consumption, more thrust and/or improved component life; improved compressor surge margin which may allow for faster engine acceleration at part speeds and better component matching at higher speeds; structural benefits such as reducing risks of shedding induced vibration and improved low cycle fatigue (LCF) life; and/or overall engine weight/cost benefits, such as extending stage operating range, improved matching between stages, shortened gaps between rows and thus potentially more compact and lower cost engines.

Preferably, but not necessarily, each of the bleed holes 36 is disposed at the same angle, i.e. the central axis 43 of each of the bleed holes 36 is orientated at the same angle relative to a common reference. In an alternate embodiment, the bleed holes 36 be oriented at different angles relative to each other. However in all cases the bleed holes 36 will be oriented such that they extend, from inlet 33 to outlet 35 thereof, in a direction that is substantially opposite to the direction of rotation flow in the main gas path of the compressor and thus opposite to the direction of rotation 27 of the rotor 24.

Further, although the bleed holes 36 may comprise a substantially circular cross-sectional perimeter (i.e. be round), bleed holes having alternately shaped cross-sectional profiles may also be provided, as can bleed slots extending through the shroud 32. Similarly, however, in all cases the bleed holes or slots will be oriented such that they extend, from their inlets to their outlets, in a direction that is substantially opposite to the direction of rotation flow in the main gas path of the compressor and thus opposite to the direction of rotation of the rotor.

The bleed holes 36 may be disposed in the outer shroud 32 in a suitable pattern or arrangement, and may, for example, be disposed in a grouping such as to form a circumferential array or band of holes. Such a circumferential band of shroud bleed holes 36 may for example be axially located at a point downstream of a leading edge of the rotor blades 28 and upstream of a trailing edge 47 thereof, as shown in FIG. 2.

Figure 4:
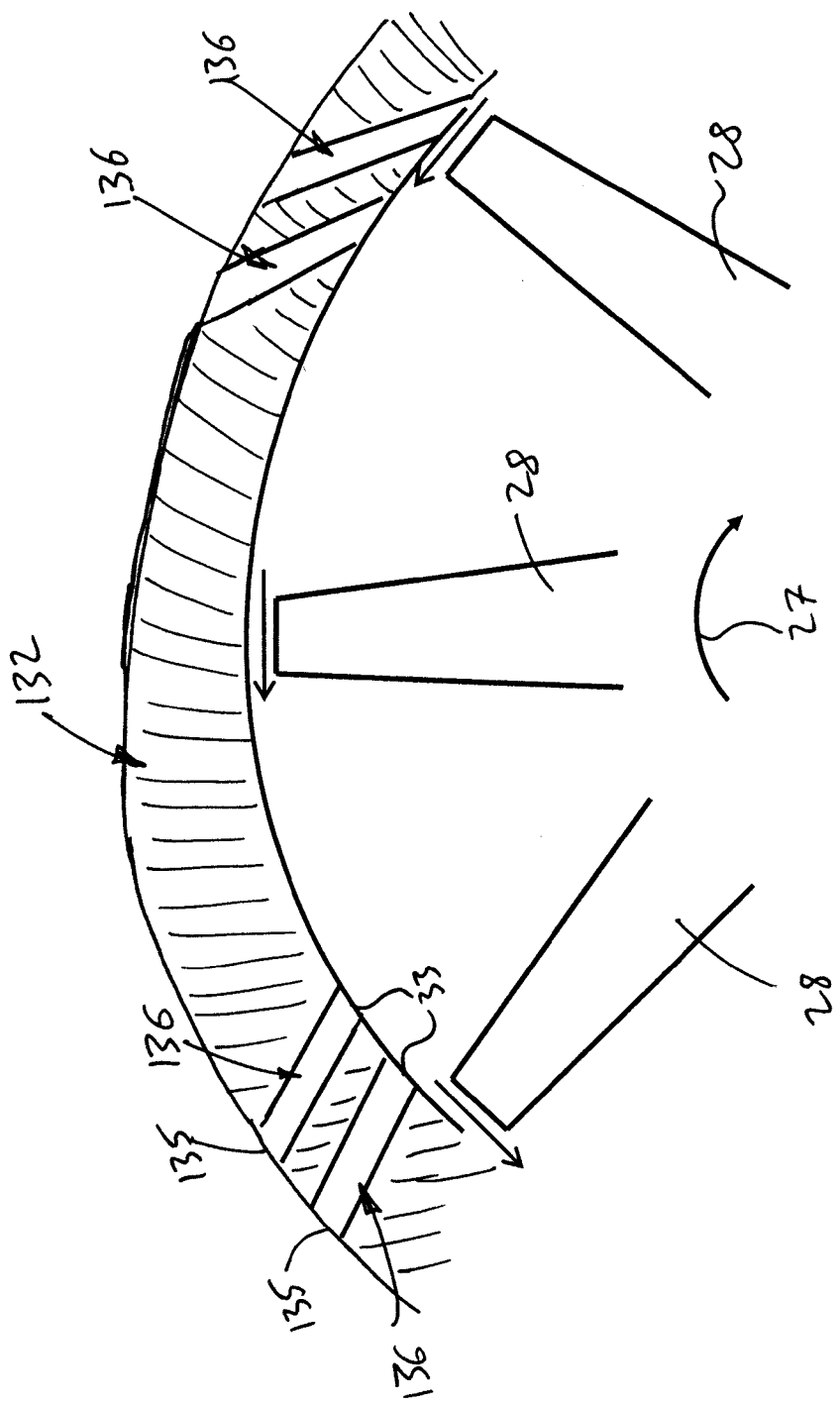
FIG. 4 is a schematic front cross-sectional view of a compressor in accordance with an alternate embodiment.

Referring now to FIGS. 4 and 5, alternate configurations of the above-described bleed holes 36 in a compressor shroud are shown. In these alternate embodiments, each of the bleed holes 136 remains as per those described above, namely circumferentially angled such that the bleed hole 136 extends through the shroud 132 in a direction which is opposite to the direction of rotation 27 of the rotor blades 28, or in other words such that the outlet end 135 of each of the bleed holes 136 is located circumferentially upstream of the inlet end 133 thereof relative to a direction of rotational flow in the annular gas flow passage driven by a direction of rotation 27 of the rotor.

However, as seen in the configuration of FIG. 4, the angled bleed holes 136 may be un-equally circumferentially spaced apart from each other (i.e. the circumferential spacing between each of the bleed holes 136 may not be equal) within the shroud. As such, a number of bleed holes 136 may be grouped together and thus provided in a greater density within specific regions of the compressor shroud relative to other regions.

Additionally, in yet another alternate configuration as depicted in FIG. 5, a plurality of bleed holes 236 may be provided and arranged in rows 260, 262. As such, in this embodiment all bleed holes 236 are not disposed in a common plane. Rather, in the depicted exampled of FIG. 5, two rows 260, 262 of bleed holes 236 are provided, and the holes in each of these rows is disposed in their own common plane 264 that is substantially perpendicular to the axis of rotation of the rotor. Each of the planes 264 may be substantially parallel to one another. Further, as can be seen in FIG. 5, the bleed holes 236 in a second row 262 may be staggered such that they are circumferentially offset from the bleed holes 236 in the first row 260. More rows can also be provided.

The above description is meant to be exemplary only, and one skilled in the art will recognize that changes may be made to the embodiments described without departing from the scope of the invention as claimed. For example, as noted above, although the embodiments described relate to an axial compressor, the compressor shroud defined herein may also be employed in a centrifugal compressor or a mixed flow rotor for example. Still other modifications which fall within the scope of the appended claims will be apparent to those skilled in the art, in light of a review of this disclosure.

The invention claimed is:

1. A compressor for a gas turbine engine comprising:
a rotor having a hub defining a central axis of rotation and a plurality of blades radially extending from the hub to project into an annular gas flow passage of said compressor, each of said blades having a remote blade tip and a leading edge defined between opposed pressure and suction surfaces, said rotor being rotatable about said axis of rotation in a direction of rotation;
an annular shroud circumferentially surrounding the rotor and having a radially inner surface adjacent to the blade tips, the inner surface of the shroud facing said annular gas flow passage; and
a plurality of bleed holes extending through said shroud adjacent said blade tips, the bleed holes providing gas flow communication between said annular gas flow passage and a region outside the shroud, each of said bleed holes having an inlet end disposed in the radially inner surface of the shroud adjacent the blade tips to communicate with the annular gas flow passage, each of said bleed holes having an outlet end disposed in a radially outer surface of the shroud, bleed air removed from the annular gas flow passage by the bleed holes flowing in a bleed flow direction from the inlet end to the outlet end of the bleed holes, the outlet end of each of said bleed holes being located circumferentially upstream of the inlet end thereof, and the bleed flow direction at the radially inner surface of the shroud has a circumferential component that is opposite to the direction of rotation of the rotor.

2. The compressor as defined in claim 1, wherein the bleed holes define a bleed hole axis extending centrally therethrough to define a bleed path along which the bleed air flows from the inlet end to the outlet end of the bleed holes, the bleed hole axis and therefore the bleed air having both a radial and a circumferential component, the circumferential component being opposite in direction to a circumferential component of the rotational flow in the annular gas flow passage.

3. The compressor as defined in claim 1, wherein the bleed holes are in misalignment with a direction of gas flow in the annular gas flow passage.

4. The compressor as defined in claim 1, wherein the bleed holes are in alignment with a direction of tip leakage air flow formed radially between the blade tips of the rotor blades and the inner surface of the shroud.

5. The compressor as defined in claim 1, wherein the bleed holes are disposed in a common plane, the plane being perpendicular to the axis of rotation of the rotor.

6. The compressor as defined in claim 1, wherein the plurality of bleed holes are disposed in two or more rows, each of said rows having bleed holes which are disposed in a common plane, each of the planes being perpendicular to the axis of rotation of the rotor and parallel to one another.

7. The compressor as defined in claim 6, wherein the bleed holes of each of said rows are circumferentially offset from the bleed holes of a next adjacent one of said rows.

8. The compressor as defined in claim 1, wherein the bleed holes are circumferentially equally spaced apart about the annular shroud.

9. The compressor as defined in claim 1, wherein the bleed holes are unequally circumferentially distributed about the annular shroud.

10. A gas turbine engine comprising:
a compressor section, a combustor and a turbine section, in serial flow communication; and
at least one of the compressor section and the turbine section including:
an axial rotor having a hub defining a central axis of rotation and a plurality of blades radially extending from the hub to project into an annular gas flow passage, each of said blades having a remote blade tip and a leading edge defined between opposed pressure and suction surfaces of the blades, said rotor being rotatable about said axis of rotation;
a shroud circumferentially surrounding the rotor and having a radially inner surface adjacent to the blade tips, the inner surface of the shroud facing said annular gas flow passage; and
a plurality of bleed holes extending through said shroud adjacent said blade tips, the bleed holes providing gas flow communication between said annular gas flow passage and a region outside the shroud, each of said bleed holes having an inlet end disposed in the radially inner surface of the shroud adjacent the blade tips to communicate with the annular gas flow passage, each of said bleed holes having an outlet end disposed in a radially outer surface of the shroud, bleed air removed from the annular gas flow passage by the bleed holes flowing in a bleed flow direction from the inlet end to the outlet end of each of the bleed holes, the outlet end of each of said bleed holes being located circumferentially upstream of the inlet end thereof, and the bleed flow direction at the radially inner surface of the shroud has a circumferential component that is opposite to a direction of rotation of the rotor.

11. The gas turbine engine as defined in claim 10, wherein the bleed holes define a bleed hole axis extending centrally therethrough to define a bleed path along which the bleed air flows from the inlet ends to the outlet ends of the bleed holes, the bleed hole axis and therefore the bleed air having both a radial and a circumferential component, the circumferential component being opposite in direction to a circumferential component of the rotational flow in the annular gas flow passage.

12. The gas turbine engine as defined in claim 10, wherein the bleed holes are in misalignment with a direction of gas flow in the annular gas flow passage.

13. The gas turbine engine as defined in claim 10, wherein the bleed holes are in alignment with a direction of tip leakage air flow formed radially between the blade tips of the rotor blades and the inner surface of the shroud.

14. The gas turbine engine as defined in claim 10, wherein at least each row of the bleed holes is disposed in a common plane, the plane being perpendicular to the axis of rotation of the rotor.

15. The gas turbine engine as defined in claim 14, wherein the bleed holes of each of said rows are circumferentially offset from the bleed holes of a next adjacent one of said rows.

16. The gas turbine engine as defined in claim 10, wherein the bleed holes are unequally circumferentially distributed about the shroud.

17. A method of bleeding tip leakage flow from a gas turbine engine compressor comprising:
providing a rotor rotatable about an axis of rotation within an outer shroud surrounding said rotor, the rotor having a plurality of radially projecting blades extending into an annular gas flow passage of the compressor, the annular gas flow passage being radially enclosed by an inner surface of the outer shroud, each of said blades having a remote blade tip and a leading edge defined between opposed pressure and suction surfaces, the inner surface of the shroud being adjacent to the blade tips and facing said annular gas flow passage;
rotating said rotor to generate a main compressor flow within the annular gas flow passage in a first rotational direction corresponding to a direction of rotation of the rotor, a tip leakage flow being formed between the blade tips and the inner surface of the shroud, the tip leakage flow being in a direction opposite to the direction of rotation of the rotor; and
bleeding off at least a portion of the tip leakage flow to a region outside the shroud using a plurality of circumferentially angled bleed holes extending through said shroud adjacent said blade tips, each of said bleed holes being disposed at an orientation at least partially aligned with the direction of the tip leakage flow, and the bleed holes being circumferentially angled such that a bleed flow direction at the inner surface of the shroud has a circumferential component that is opposite to a direction of rotation of the rotor.

18. The method as defined in claim 17, further comprising providing the bleed holes in the outer shroud, the inlet end of the bleed holes disposed in the radially inner surface of the shroud adjacent the blade tips, each of said bleed holes having an outlet end disposed in a radially outer surface of the shroud, the tip leakage flow bled from the annular gas flow passage by the bleed holes flowing from the inlet ends to the outlet ends thereof, the outlet end of each of said bleed holes being located circumferentially upstream of the inlet end thereof relative to a direction of rotational flow in the annular gas flow passage driven by the direction of rotation of the rotor.

19. The method as defined in claim 17, further comprising forming the bleed holes in the outer shroud within a common plane, the plane being perpendicular to the axis of rotation of the rotor.

20. The method as defined in claim 17, further comprising increasing a surge margin of the compressor by performing the step of bleeding off the at least the portion of the tip leakage flow.

* * * * *